Sept. 26, 1967     A. L. FREEDLANDER ET AL     3,343,352

OFFSET LAWN MOWER BLADE

Filed Oct. 24, 1966

INVENTORS
ABRAHAM L. FREEDLANDER
ROBERT E. MATTHEWS
WAYNE C. GARRETT
BY

*Reuben Wolk*

ATTORNEY

United States Patent Office 3,343,352
Patented Sept. 26, 1967

3,343,352
OFFSET LAWN MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Oct. 24, 1966, Ser. No. 589,105
3 Claims. (Cl. 56—295)

ABSTRACT OF THE DISCLOSURE

A flexible elastomeric safety lawn mower blade for a power driven rotary lawn mower. The blade is made of a material such as a urethane elastomer which permits it to flex when striking a shoe or other obstruction. The blade is made of one or two pieces; in either case the cutting arms are offset from each other on the shaft.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

It is, therefore, a principal object of this invention to provide a lawn mower blade that minimizes the possibility of personal injury.

It is a further object to provide such a blade which is inexpensive and simple to manufacture.

It is a further object to provide a blade which retains its cutting edge for a long period of time.

It is another object of the invention to provide a blade with multiple cutting arms which retain their elastomeric properties throughout their life.

Other objects of the invention will be readily apparent in the following description and as shown in the accompanying drawings, in which.

Figure 1:
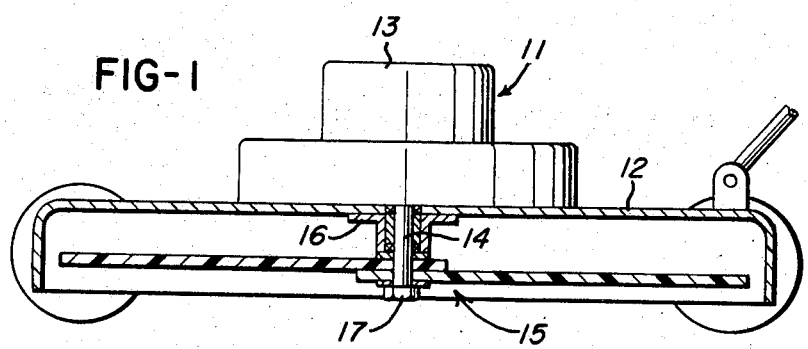
FIGURE 1 is a side elevational view of a typical lawn mower, in partial section.

Referring now to the drawings, FIGURE 1 illustrates a conventional lawn mower 11 having a housing 12 upon which is mounted a motor 13 and a shaft 14 extending downwardly through the housing. Mounted on the shaft is the blade 15 which is secured to the shaft by means of a bushing 16 and a nut 17.

Figure 2:
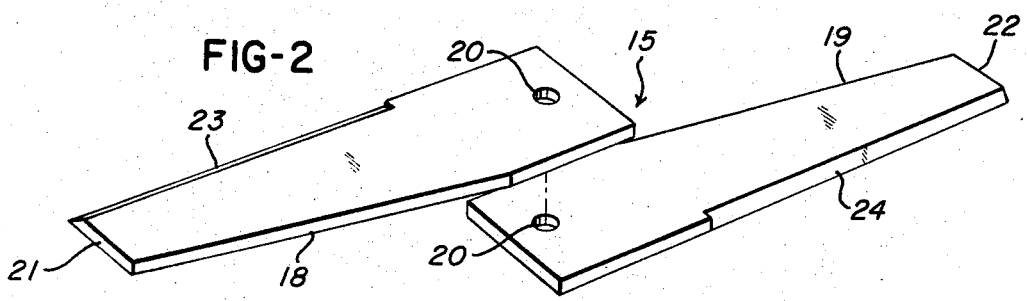
FIGURE 2 is a perspective view of a novel blade in accordance with the invention.

The blade 15 as shown in FIGURE 2 is made of two opposite outwardly extending arms 18 and 19 which are mounted in overlapping relationship. These arms are each made of a single layer of elastomeric material having an aperture 20 in the center thereof for mounting purposes. The overlapping portions of the members have a maximum width extending for about one-third the length of each member. The members then taper toward their outer edges and terminate in the tips 21 and 22, one edge of which provides a cutting surface. At this point the tips are approximately one-half the width of the overlapping portions. The leading edges of each arm are beveled partly along their length, thus providing cutting edges 23 and 24. It is also possible to provide a chisel point, if desired, so that the cutting edge is centrally located with respect to the cutting arm or it is possible to bevel the sharpened edge in the direction oppositely from that shown.

By mounting the blade members in overlapping relationship as shown, they are offset to each other on the shaft in a vertical direction. The combination of the two blades at different heights with respect to the grass being cut, creates a special cutting action not otherwise obtainable. This is particularly true in tall grass or weeds, where the successive effect of the two blades is helpful in eliminating such heavy growths that might otherwise tend to stall the mower.

The blade is made of a material that maintains its structural integrity without the need for reinforcing materials. A preferred material is described in my copending application Ser. No. 579,304, filed Sept. 14, 1966, of common assignment, and is a urethane elastomer of the type which is adapted to be cast and which is formulated from a polyester based isocyanate terminated prepolymer. This material is formed through a chain extension with selected polyols or other polyfunctional active hydrogen materials and has been found to provide the necessary physical and mechanical characteristics. The material may be used in a wide range from 90 Shore A to 70 Shore D and has the following characteristics:

Hardness, 90–95 A; 50–55 D; 65–70 D
Tensile strength, p.s.i., 4000–5000; 5000–6000; 3500–4500
Tear strength, p.l.i., 300–400; 600–700; 500–650

A successful lawn mower blade should have a minimum of elongation, in order to reduce stress, minimize abrasion, reduce flutter, and prevent the blade from striking the housing. The material described above has a very low elongation and excellent elastic memory, so that the blade will always return to its initial length after conclusion of the operation. The blade manufactured of this material will thus have sufficient structural integrity to provide satisfactory grass cutting, and yet will have sufficient flexibility to yield when striking extraneous objects such as a shoe, a rock, or a post, and will both glide over the object and have a certain amount of cushioning effect so that neither the object nor the blade will be damaged. It is important to remember that this is accomplished without the use of any reinforcing materials whatsoever so that the blade is completely homogeneous. Of course, it is possible to add reinforcing materials such as fabric or cords, if extra stiffness is desired.

Figure 3:
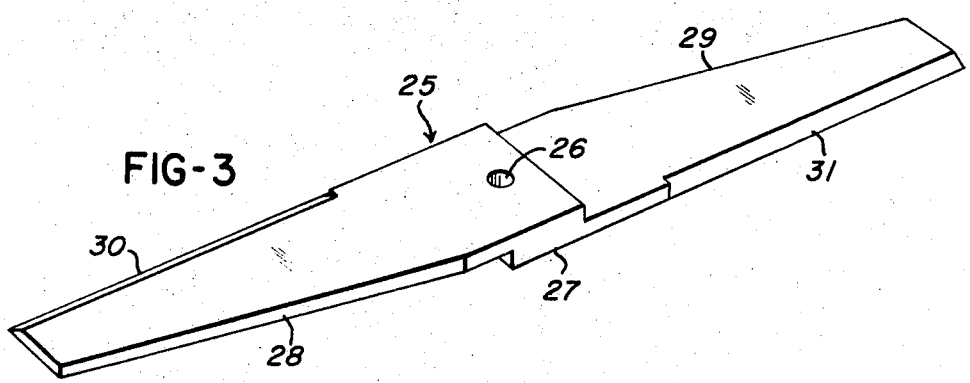
FIGURE 3 is a view similar to FIGURE 2 illustrating a modified form of the invention.

FIGURE 3 illustrates a modified form of the invention in which a blade 25 is formed quite similarly to blade 15, except that the blade is formed of one piece having arms 28 and 29 which are offset from each other, and joined by a central member 27 having a mounting hole 26. The cutting edges 30 and 31 are located as in the blade 15. The blade 25 has the same action and effect as blade 15.

Other variations in the above forms are contemplated as being within the scope of this invention, since it has been found that a variation in the thickness or width of the blade or the shape of the curve will affect the flexibility and cutting properties of the blade. It should also be noted that while the present blade is described as being formed of a single homogeneous layer of material, it might also be formed of multiple layers which are permanently joined. It should also be noted that while the blades 15 and 25 are illustrated as having two arms, they could just as easily be formed of three, four or more arms if desired.

What is claimed is:

1. In a lawn mower having a rotatable shaft, a cutting blade mounted on said shaft composed entirely of a flexible urethane elastomer, said blade having opposite outwardly extending arms forming cutting surfaces, said arms being offset from each other on said shaft.

2. The blade of claim 1 in which said arms are separate members.

3. The blade of claim 1 in which said arms are joined at a central portion.

References Cited

UNITED STATES PATENTS

| | | | |
|---|---|---|---|
| 3,109,274 | 11/1963 | Sheppard | 56—295 |
| 3,156,082 | 11/1964 | Joyner | 56—295 |
| 3,158,977 | 12/1964 | Williams | 56—295 |

ABRAHAM G. STONE, *Primary Examiner.*

ANTONIO F. GUIDA, *Examiner.*